United States Patent [19]

Besseyre

[11] Patent Number: 4,847,877
[45] Date of Patent: Jul. 11, 1989

[54] METHOD AND APPARATUS FOR DETECTING A PREDETERMINED BIT PATTERN WITHIN A SERIAL BIT STREAM

[75] Inventor: Jacques A. Besseyre, Cagnes sur Mer, France

[73] Assignee: International Business Machines Corporation, Armonk, N.Y.

[21] Appl. No.: 935,898

[22] Filed: Nov. 28, 1986

[51] Int. Cl.$^4$ .......................... H04L 7/00; G05B 1/00
[52] U.S. Cl. .................................. 375/116; 340/146.2; 375/114
[58] Field of Search .............................. 375/116, 114; 340/146.2; 364/728

[56] References Cited

U.S. PATENT DOCUMENTS

| | | | |
|---|---|---|---|
| 3,575,554 | 4/1971 | Schmidt | 375/116 |
| 3,940,563 | 2/1976 | Susset | 375/116 |
| 4,016,368 | 4/1977 | Apple, Jr. | 375/116 |
| 4,032,885 | 6/1977 | Roth | 375/116 |
| 4,158,748 | 6/1979 | En | 375/116 |
| 4,227,175 | 10/1980 | Newman | 340/146.2 |
| 4,247,945 | 2/1981 | Seibel | 375/114 |
| 4,347,606 | 8/1982 | Hoogeveen | 375/116 |
| 4,611,336 | 9/1986 | Fryer | 375/116 |
| 4,613,980 | 9/1986 | Newlin et al. | 375/116 |
| 4,646,329 | 2/1987 | Bojarski | 375/116 |
| 4,694,473 | 9/1987 | Etoh | 375/116 |

Primary Examiner—Stephen C. Buczinski
Assistant Examiner—Linda J. Wallace
Attorney, Agent, or Firm—John E. Hoel

[57] ABSTRACT

The invention relates to a method and an apparatus for the fast detection of a predetermined pattern of n bits embedded in a serial bit stream. The n bits are adjacent or regularly distributed over the bit stream, and form a unique word which may in particular be used as a synchronization pattern, the detection of which allows to conclude that a synchronization status has been reached within the signal detected at a reception node. The method consists in detecting first a synchronization root, which is a subset of n' consecutive bits of the unique word. Then, succeeding potential bits of the unique word are detected from the serial bit stream, and each potential bit of the unique word is compared to the corresponding bit of the stored unique word. At each match, a counter is incremented, and when the count of the consecutive matches reaches a predetermined number, the unique word is said to be detected. However, if a mismatch occurs in a comparison step before the right count is reached, it is immediately derived that the unique word has not yet been detected, and the search process is reset. Thus, a non-detection of the unique word can be evidenced very early and accordingly, a substantial amount of time can be saved in the detection, since in the average, it is not necessary to go through n comparison steps to conclude a non-detection of the unique word. The method and apparatus according to the invention find an advantageous application in the detection of a synchronization pattern included in a Time Division Multiplexed signal, said pattern comprising n bits distributed over the TDM signal in a predetermined sequence.

9 Claims, 5 Drawing Sheets

METHOD AND APPARATUS FOR DETECTING A PREDETERMINED BIT PATTERN WITHIN A SERIAL BIT STREAM

DESCRIPTION

1. Field of the Invention

The present invention broadly relates to digital communications and more particularly to a method and apparatus for improving detection of a particular bit pattern in an incoming serial stream of bits.

2. Background of the Invention

In several data communication systems, at the receiver end, some actions such as, set a test command in a modem, define a synchronization mark, start a program etc..., are controlled by detection of a predetermined bit pattern, also called "unique word" included in the incoming bit stream. Detection of such a pattern raises two main difficulties:

Since the bit pattern to be detected is imbedded in the data stream, it should be very particular to be easily recognized and departed from the data The process of detecting said bit pattern, which is taking place permanently, should require as little computing time and power as possible. As will be seen farther, this is even more critical when the bits of the unique word are each embedded in a different frame of a Time Division Multiplexed signal, in order, for instance, to mark the beginning of each frame.

When the unique word to be detected is a set of n successive bits embedded in a stream of bits arriving at a rate F0, the main problem met in a straightforward solution consists in monitoring permanently at least n successive bits and doing much high speed processing to determine, nearly in real-time, if the n last received bits are equal to the unique word to be detected.

When the n bits of the unique word are distributed within the incoming bit stream, for instance regularly distributed within said stream as it happens in a Time Division Multiplexed signal, the main problem consists in keeping enough incoming bits in storage to allow detection of the distributed n bits of the unique word or of a significant number of bits of the unique word if the latter is continuously repeated during the entire transmission. For instance, according to the techniques known in the prior art, if the unique word is 12 bits long and spread over twelve frames, and if the frames of a Time Division Multiplexed (TDM) signal comprise 193 bits each (192 data bits and one bit of the unique word), detection of the unique word in one unique search process would require a huge shift register of at least $193 \times 12 = 2316$ bits, and complex decoding means to detect 12 regularly spaced bits and compare them, by a moving correlation technique at the TDM signal clock rate, with the known 12 bits of the unique word!

However, such a problem has a real importance and is encountered, for example, during the synchronization of TDM synchronous communications over communications links such as Time Division Multiple Access (TDMA) satellite communications systems. As will be seen farther, TDMA signals require the appending of a sequence of synchronization bits located at the beginning of a multiplexed message transmitted over the link, or imbedded into the frames of said message, to enable the receiving station to adequately synchronize its receive clocks with the traffic portions of the message, before the processing. Thus, in TDMA communications, it can easily be appreciated that any error in the reception of the synchronization pattern will prevent the receiving station from actively identifying the beginning of a message. However, the problem of the detection of a unique word, and the solution described hereafter, are not only relevant to a bit stream transmitted from a transmission node to a reception node, but can also occur at any point within a circuit, where passes a serial bit stream.

Consequently, many attempts have been made in the prior art, aimed to an efficient recovery of a predetermined pattern like a synchronization pattern distributed over a data bit stream. But those attempts did generally consist in detecting long patterns containing a substantial amount of redundancy, and requiring a substantial decoding interval, which reduces efficiency of the communications link.

OBJECTS OF THE INVENTION

It is therefore a general object of the invention to provide a method and a system for more rapidly identifying a predetermined pattern of bits which are embedded, in an adjacent or distributed manner, in a serial bit steram, than the methods available in the prior art.

It is still another object of the invention to provide a means permitting a rapid recognition of a given pattern of bits in the specific case of a TDMA signal, where said pattern to be detected is distributed over the serial bit stream.

SUMMARY OF THE INVENTION

Therefore, the present invention relates to a method and apparatus for detecting a predetermined pattern of n bits included within a serial bit stream, said n bits being adjacent or distributed over the bit stream according to a predetermined sequence representing a unique word chosen to contain m different valid subsets of n' successive bits (with $1 < m < n$ and $1 < n' < n$). Each such a subset is said to be valid provided it is determined in a unique manner by its position within the unique word and thus permits to determine the (n-n') remaining bits of said unique word, which follow the cited n' bits.

The method according to the invention includes, among its steps:

detecting at a reception node, subsets of n' bits of the serial received bit stream;

comparing each detected subset of n' bits to all of the m valid subsets to identify the event of having detected a particular subset among the m valid subsets, and on said event, verifying if the entire unique word has been received, by determining among the received bits, each of the potential bits of said unique word, and comparing consecutively each of those potential bits, to each of the (n-n') bits which follow the n' bits of the particular subset of the unique word which has already been detected.

counting the number of successive matches that occur during the comparison step between the couples of bits being compared, and when a predetermined number of matches is reached, deciding that the unique word has effectively been detected. Accordingly, an appropriate signal is raised, which can in turn start an action or set an adequate status within the reception node circuits.

The apparatus for the implementation of the previously described method, which is located at the reception node, receives the serial bit stream comprising the data bits and the bits contained in the unique word.

According to the invention, this apparatus includes: first detection means for the detection of n' bits of the bit stream, which are connected to first decoding means who generate a "VALID SUBSET" signal when the detected subset of n' bits is decoded as being a valid subset.

storage means containing m different subsets of (n-n') consecutive bits of the unique word. More precisely, each of the subsets of (n-n') bits is equal to the unique word minus a particular valid subset of n' bits. The cited storage means are addressed by the output of the first detecting means (n' bits), and deliver at their output the specific subset of (n-n') bits corresponding to the address applied to the entry of said storage means. However, the output of a subset of (n-n') bits is only possible on receipt by the storage means, of a "VALID SUBSET" command transmitted by the first decoding means.

second detecting means for the detection, in the received serial bit stream, of the next potential bits of the unique word comparison means performing the comparison between, on the one hand, the said potential bits of the unique word which are being provided by the second detecting means mentioned above, and on the other hand, the successive bits included in the specific subset of (n-n') bits provided by the storage means. These comparison means generate at their output, an "EQUALITY PULSE", which is for instance a "one" each time a match occurs between two compared bits, and a "zero" each time a mismatch occurs.

first counting means connected to the output of the comparison means and performing the counting of the above mentioned matches.

second decoding means connected to said counting means and performing the decoding of a predetermined number reached by the first counting means.

Accordingly, these second decoding means raise their output line to indicate that the unique word has been detected.

DESCRIPTION OF THE FIGURES

These and other objects, features and advantages of the invention will be more fully appreciated with reference to the accompanying figures.

DESCRIPTION OF THE PREFERRED EMBODIMENT OF THE INVENTION

Figure 1:
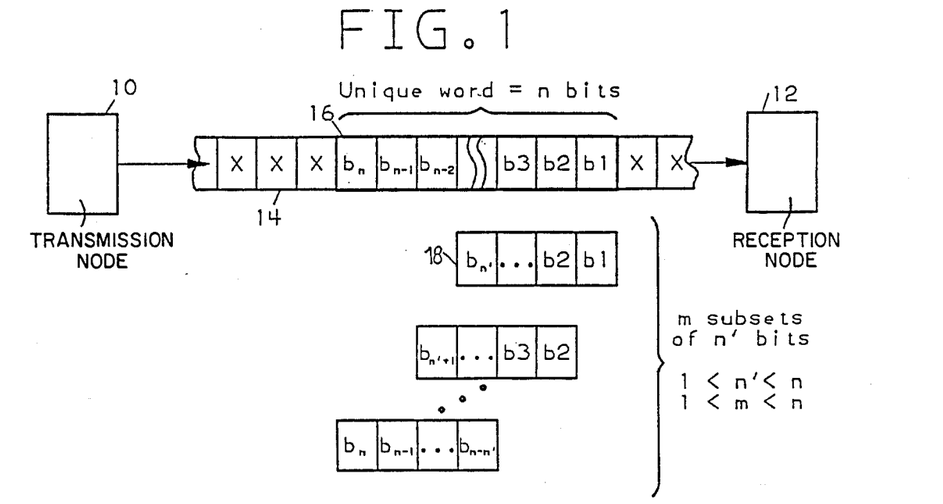
FIG. 1 is a schematic diagram illustrating the principles of the method for detecting a predetermined bit pattern in a serial bit stream, according to the invention.

Before the detailed description of the Preferred Embodiment of the Invention, the basic theory of operation used therein will be described. In FIG. 1, a serial bit stream (14) is represented, which is transmitted from a transmission node (10) to a reception node (12). This serial bit stream (14) includes a unique word (16) composed of n bits.

The bits of the unique word are at first supposed to be adjacent, as represented but could as well be regularly distributed over the bit stream and two consecutive bits of the unique word could be separated by x data bits, without affecting the generality of the scope of the invention.

The unique word (16) is not a random one, but is chosen to include m different subsets (18) containing each n' consecutive bits of the unique word, where $1<m<n$ and $1<n'<n$. Such unique words (16) are well known in data communications, and it is established that for a given length n of said unique word (16), a number n' can be found so that each of the different m subsets of n' bits be met exactly once in the unique word, and each subset is defined in a unique manner by its position within said unique word. In the following developments, subsets of n' bits as previously defined will be called "valid subsets" (18). For a given subset (18) of n' bits, the remaining (n-n') bits of the unique word are also defined in a unique way. More accurately, each subset of (n-n') consecutive bits is equal to the unique word minus the corresponding particular valid subset of n' bits. When the serial bit stream (14) is received at the reception node (12), the search for the unique word begins, but there is no immediate indication on which portion of the stream is being examined.

It is the purpose of the method herein described, to use the above mentioned subsets (18) of n' bits of the unique word, to speed up the recognition of the unique word in the serial bit stream (14). According to the invention, by searching in the bit stream for a valid subset of n' consecutive bits of the unique word, one can identify in which part of the unique word the search has commenced, and from that knowledge, predict the (n-n') bits that should follow, and compare them with the (n-n') bits really detected. If they match, it can be concluded that the n bits (since $n'+(n-n')=n$) have been detected, and that means that the unique word has been detected.

In an error free environment, if there is a mismatch before all the n bits of the unique word are recognized, it can immediately be concluded that the unique word has not yet been received, and a new search step can begin right-away, while the current search step is stopped. Thus, many time can be saved, and, the earlier a mismatch occurs in a search step, the greater is the amount of processing time saved in the given step. Therefore, a greater number of search steps can be initiated in a given time period, and the performance of this method for detecting a unique word in a serial bit stream is accordingly improved, even in an error prone environment.

Figure 2:
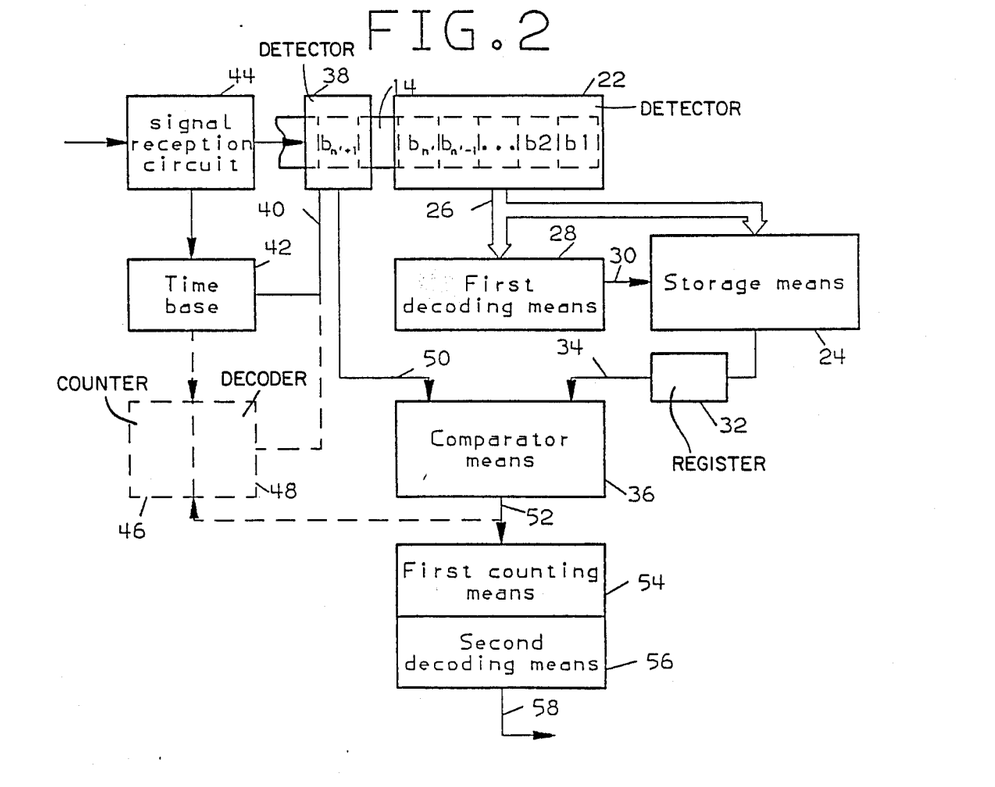
FIG. 2 is a block diagram showing the basic components of an apparatus for the implementation of the principles illustrated in FIG. 1.

In FIG. 2, a block diagram of a general implementation (20) of the previously described method is represented, being understood that a more complete implementation will be described farther, in relation with the best specific embodiment of the invention.

According to the above mentioned method, it is necessary to detect subsets of n' bits of the serial bit stream (14) to locate a "valid subset". This is achieved by first detection means (22), located within the reception node (not represented), where the serial bit stream enters at a rate defined by the received clock signal, being assumed that the received clock is previously derived from the received signal, as known in the art. Once a set of n' bits has been detected, it is necessary to compare these n' bits to all of the m valid subsets included in the unique word to be recognized. This requires that said m valid subsets be stored, so that they may be compared to each detected subset of n' bits, during a search process of the unique word. Therefore, adequate storage means (24) are provided. These storage means are preferably addressed by the output (26) of the first detection means (22), at which output (26) the n' bits of the currently detected subset are available.

First decoding means (28) are provided, which are connected to the output (26) of the first detection means (22). Said decoding means (28) may be constituted by a simple combinatorial logic, which decodes the m valid subsets of n' bits and raises at its output (30), a "VALID SUBSET" signal when a valid subset has been decoded. The latter signal is applied to the storage means (24), where it works as a read command, thus permitting the reading, from said storage means, of the subset of (n-n') bits of the unique word, which is complementary to the subset of n' bits applied to the storage means as an address.

Accordingly, the (n-n') bits of the unique word, whose detection (or non detection) remains to be checked, are transferred from the storage means (24) into a register (32). The output (34) of this register is connected to first comparison means (36) where the content of register (32) will be compared, bit after bit, to the successive potential bits of the unique word, that are besides being detected.

The determination of these potential bits of the unique word is made by second detection means (38) who detect said potential bits from the serial bit stream (14).

If the bits of the unique word are adjacent in the serial bit stream, each bit b(n'+1) to bn following the last bit bn' detected by the first detection means (22) might be another potential bit of the unique word. Therefore, in this case, the second detection means (38) can advantageously comprise a single latch, receiving on wire (40) a detecting command at the received clock rate, the received clock being directly derived from the time base (42) connected to the signal reception circuit (44) of the reception node.

If the bits of the unique word are regularly distributed over the serial bit stream (for instance in the case of a TDM signal), two consecutive bits of the unique word are separated by a number x of data bits. Therefore, once n' bits b1, b2, ...bn' of the unique word have been detected by the first detection means (22), the next potential bits b(n'+1), ... bn of the unique word arrive at a "one every x+1 bits of the stream" rate. Consequently, their detection will easily be performed by the second detection means (38), receiving this time a detecting command derived from second counting means (46) and third decoding means (48), which transmit a detecting command on wire (40) every (x+1)th clock pulse.

The detection, decoding, storage and comparison means will be more completely described farther, in relation with the most advantageous embodiment of the invention, wherein the serial bit stream is a TDM signal, in which a unique word is comprised of 12 bits regularly distributed over the bit stream. In both cases previously mentioned, the output (50) of the second detection means (38) transmits the successively detected (n-n') potential bits of the unique word, to the first comparison means (36). There, each of said potential bits is compared to the corresponding bit among the bits of the specific subset of the (n-n') bits of the unique word, transmitted by the storage means (24) through resistor (32) as previously described. Accordingly, the said first comparison means (36) generate an "equality pulse" on its output wire (52). For instance, when the first comparison means (36) detect a match between the bits input on wires (34) and (50), a "one" is output on wire (52), and in case of a mismatch, a "zero" is output, which is equivalent to a "non equality pulse". The output wire (52) is connected to first counting means (54) who perform the counting of the matches, and who are themselves connected to second decoding means (56).

When a predetermined number A of consecutive matches has been reached, it must be decided that the unique word has been fully detected. Accordingly, the second decoding means (56) are configured to decode A, and upon such decoding, they raise their output line (58) to indicate that the unique word has been detected.

It is to be noted that, if the unique word contains a finite number n of adjacent bits, A may advantageously be equal to n-n' as previously defined. In the case of a TDM signal, the unique word may be a continuous wrapping of the same sequence of n bits, and accordingly, A will be any number great enough to allow a high level of confidence ($10 \exp^{-6}$ of error rate), the conclusion that the unique word is detected when A bits have been correctly detected after the n' first detected bits.

As mentioned above, the previously described method and apparatus have an advantageous application in the case of a TDM signal, containing a unique word to be detected, said unique word comprising n bits regularly distributed over the serial bit stream of the TDM signal.

This method and apparatus will now be described in relation to a particular TDM signal: the so-called T1 signal, which is often used in data communications. As will be seen, the present unique word detection method, applied to a T1 signal, will allow to synchronize the frames of said signal.

The purpose of the following developments is first to describe the specific problem related to T1 signals, second to remind briefly an existing solution, and third to establish a new implementation derived from the previously described unique word detecting general method and apparatus.

Figure 3:
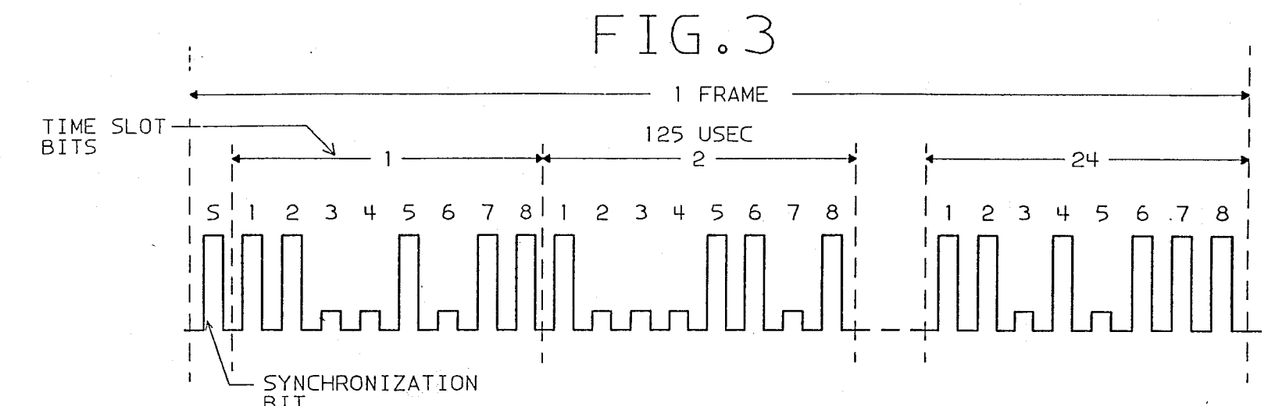
FIG. 3 is a waveform and timing diagram showing the frame organization of a T1 signal.

The D2/D3 (or equivalent) channel banks communicate through a T1 channel at a 1.544 Mbps rate. As shown in FIG. 3, the frame of such a transmission means is composed of 193 bits, partitioned into 24 time slots of 125 microseconds. Each time slot contains 8 bits encoded into a PCM word and corresponding to a single voice channel. Thus $8 \times 24 = 192$ bits carry digital voice, and the 193rd bit is the synchronization bit or S bit. According to the D2/D3 channel standardized format, the successive S bits follow two imbricated patterns: every two frames, the S bit alternates between 0 and 1 and thus forms a first pattern equivalent to 1010101010...., and the corresponding frames are called synchronization frames. Further, the S bits of the frames which are imbricated between the previous ones follow a second pattern, specific to T1 signals: the unique word 100011011100 composed of n=12 bits regularly distributed over the T1 signal, and used for synchronization purposes. Therefore, this specific unique word will from now on be called : synchronization pattern.

Figure 4:
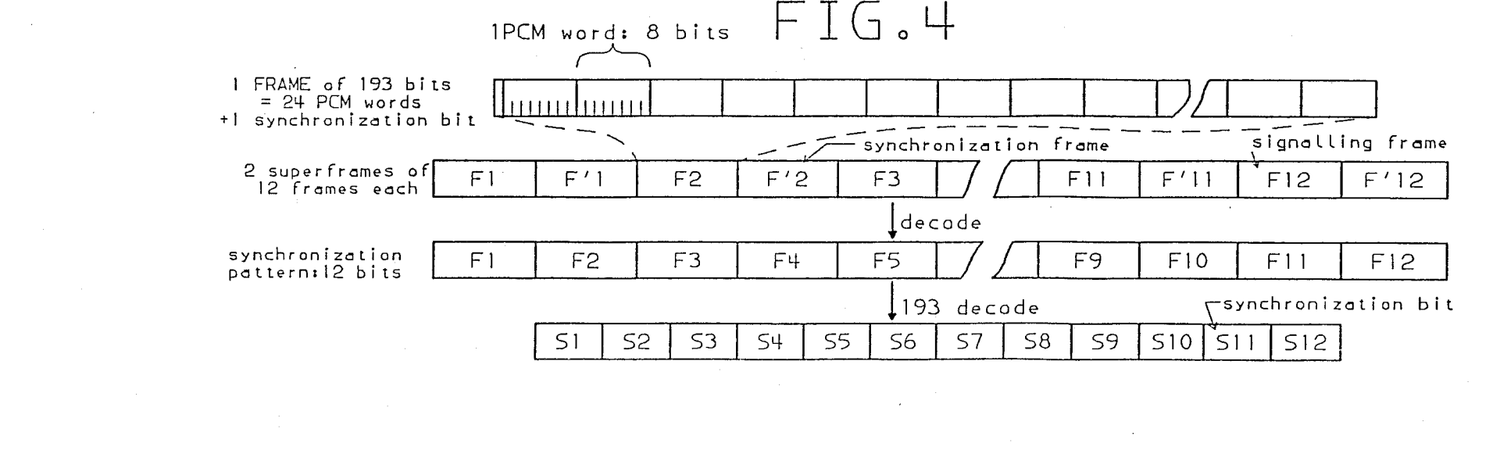
FIG. 4 is a diagram showing the frame organization within the successive frames of the T1 signal.

According further to the D2/D3 channel format, the successive frames are grouped in frame groups of 6 frames and in super frames of 12 basic frames of 193 bits (FIG. 4). As a result, it appears that a TDMA burst of 24 frames contains the said first pattern of synchronization bits 101010101010 imbricated with the synchronization pattern : 100011011100. It is to be noted that on the Figures, the synchronization bits have been represented at the beginning of the frames for greater simplicity, but other positions can be occupied by them, provided indeed that said synchronization bits be all spaced apart by x=192 data bits.

Before framing synchronization is established, the received bit pattern looks like a random bit pattern. In particular, the assumption is made in all what follows that no particular sequence of bits is sent together with the T1 signal to help synchronization acquistion.

The purpose of establishing frame synchronization is therefore to allow to identify the synchronization bit pattern, and from there to recognize the slot identification and consequently, the position and significance of each bit of the TDMA burst corresponding to a T1 signal. An existing solution to the specific problem of T1 signal synchronization has been described in Bell System Technical Journal, October 1972, pages 1704 to 1708. It uses the alternance property of the S bit in the synchronization frames, which property has been mentioned above. Initially, eight bits of the T1 signal are fed into an input shift register I, and two frames later (2×193 bits later) eight new bits are coming. These eight new bits are compared to the last eight bits. If they show the valid alternance, a bit equal to "1" is loaded into a synchronization register S; if they do not, a "Zero" is loaded. The I and S shift registers are shifted until a bit equal to one appears in the first position. If the bit in position 1 of shift register S remains equal to "1" for 20 frames (10×2 frames), synchronization is reached. With this approach, synchronization is said to be reached out on the average in 43 ms with a standard deviation of 4 ms. With a larger shift register (16 bits), average synchronization time would be of the order of 26 ms. These figures are given for a low error rate on the channel, assumed to be equal to 10−6.

According to the synchronization pattern detection method of the present invention, the previously described synchronization frames are not used, but only the frames imbricated between them and containing, for each, onee bit of the predetermined synchronization pattern 100011011100, are used.

Therefore, it will from now on be assumed that only the frames who contain a bit of the synchronization pattern are transmitted by the T1 reception circuit (100) (FIG. 5), the other frames being discarded by said circuit. Accordingly, the 12 bits of the synchronization pattern are included in the random serial bit stream (102) delivered by said T1 reception circuit (100), and within said stream, two consecutive bits of the synchronization pattern are spaced apart by x=192 data bits. The problem consists now in locating the known synchronization pattern within the random serial bit stream, by using the unique word detection method described above.

Figure 5:
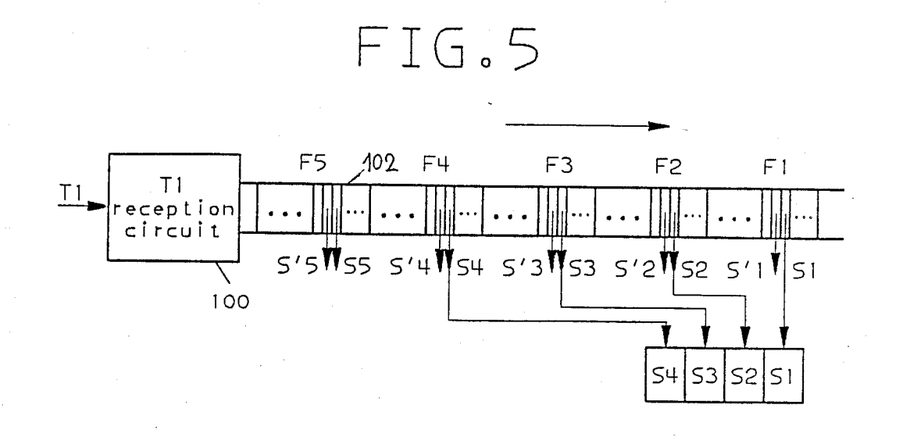
FIG. 5 is a diagram illustrating the position of the bits of the unique word in a set of frames.

The application of this method to the specific case of the T1 signal will consist in extracting from the serial bit stream (102), a subset of n′=4 bits (spaced by x=192 data bits), which match with a subset of four bits of the synchronization pattern 1000110011100, and which will be used as a root allowing the start of a comparison step to very the receipt of the entire synchronization pattern.

Thus, on detection of a valid subset of four bits of the synchronization pattern, the eight following bits of said synchronization pattern will be predicted, and then successively compared with the eight bits that are really decoded from the serial bit stream (102).

If a match occurs, the same operation is repeated a predetermined number of times and for each match, a synchronization counter is incremented.

Synchronization is said to be reached only once the synchronization counter has counted a predetermined number of matches here preferably equal to 12, but depending on the error rate of the transmission. Since the synchronization counter may be preset to four on detection of a valid subset of four bits, eight incrementations are made for eight consecutive matches, and then an "8" value (n-n′=12−4=8) may be decoded.

If a mismatch occurs before the synchronization counter has reached the right value, said counter is reset and another group of four bits is extracted from the signal and compared to the possible synchronization roots, until synchronization is reached. Thus, the algorithm used for searching synchronization permits to replace the recognition of the entire synchronization pattern (including 12 bits) at once, by the recognition of a valid subset of four successive bits of said pattern, followed by the determination of the position of said subset within the entire pattern.

Therefore, once a valid subset of four successive bits of the synchronization pattern has been identified, it must only be verified that the succeeding potential synchronization bits which are detected fit into the synchronization pattern after the valid subset previously mentioned. If, for an example, the fifth detected synchronization bit does not match the corresponding bit of the synchronization pattern, it can immediately be derived that synchronization is not reached yet, without having to continue the detection of the succeeding potential synchronization bits until obtention of a set of twelve to be correlated with the entire synchronization pattern.

According to the general unique word detection method as previously described, the early detection of a mismatch means that the synchronization status has not yet been reached, and allows an early restart of the search algorithm, and the overall synchronization search time is accordingly cut down.

Figure 6:
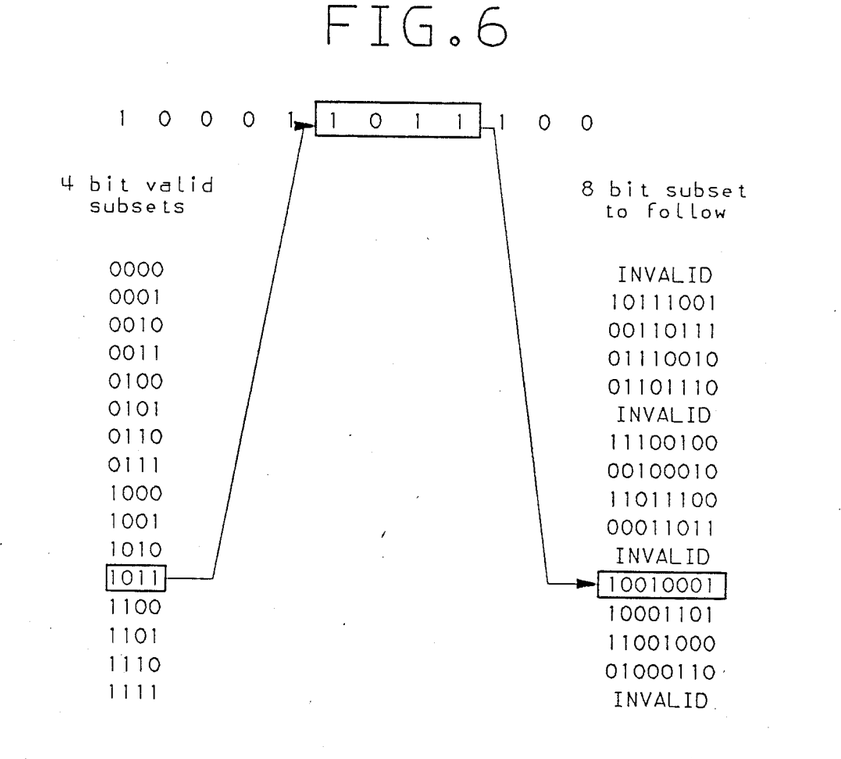
FIG. 6 is a table illustrating the relationship of the valid four-bits subsets and the eight-bit subsets of the unique word.

For a better understanding of the algorithm involved in the detection method of the present invention, the reason of choosing four bits long synchronization roots will now be explained. Obviously, in the synchronization pattern 100011011100, there is no subset of one, two or three consecutive bits which would allow a unique determination of the bits of the pattern which, according to the prediction step, should follow said subset. For example, if the first synchronization bit is assumed to be a one, it is impossible to determine which among the six ones of the synchronization pattern has been detected. The same is true for subsets of two or three bits. However, it is easy to notice that any subset of four (or more) consecutive bits of the synchronization pattern is met only once in said pattern. Therefore, the detection of such a subset of four bits allows a unique determination of the position of the search algorithm in the synchronization pattern, when the detection of said subset is being made. It is also to be noticed that among the 16 possible combinations of four bits, four combinations are never met in the standard synchronization pattern: 0101, 1010, 0000, and 1111. These four combinations are invalid ones for the synchronization search algorithm, and must be discarded by it as will be explained farther. Each of the twelve remaining combinations can be located exactly once in the synchronization pattern, as shown in FIG. 6, where each valid subset of four bits corresponds to a well determined subset of eight remaining bits of the synchronization pattern, who follow said subset.

Therefore, each of those combinations are valid for predicting what the eight succeeding bits of the synchronization pattern will be. For instance, if the four first detected synchronization bits are S1 S2 S3 S4 =1011, it can be inferred, as shown by the arrow in FIG. 6, that the succeeding detected potential synchronization bits should be S5 S6 S7 S8 S9 S10 S11 S12 =10010001, if the synchronization status has been reached. Should a detected potential synchronization bit mismatch the corresponding bit among the eight remaining bits of the synchronization pattern, will it mean that synchronization has not yet been reached. Consequently, the synchronization search algorithm is restarted and applied to the next detected subset of four potential synchronization bits S'1 S'2 S'3 S'4, each S'bit being obtained by one shift to the left relatively to the corresponding S bit in the frames (FIG. 5). The algorithm is restarted until synchronisation is reached.

Naturally, it is obvious that the same result could have been obtained with subsets of more than four bits. However, subsets of four bits are the smallest possible valid subsets to work with the described synchronization pattern detection method and the particular synchronization pattern, and also those which enable the fastest synchronization recovery. Thus, in the following developments, it will be assumed that n=12, n'=4 and m=12.

It has to be noted that the described synchronization recovery method could easily be generalized and applied to other frame organizations of TDMA signals, since the length of valid subsets depends essentially on the number of frames contained in a super frame, and on the number of synchronization bits per frame.

An advantageous implementation of the previously described synchronization recovery method will now be described with reference to FIGS. 7 and 8.

It is clear that this implementation is only one possibility among others, but it is simple and leads to a fast detection of the synchronization pattern. The frames of the T1 signal, which contain one synchronization bit of the synchronization pattern each, are received by the 1st and 2nd detecting means (122, 138) on line (110). The received serial bit stream is clocked by the received clock at a rate of 1.544 Mbits/s in the present case. The 1st decoding means (122) comprise several shift registers (164, 166, 168, 170, 172, 174, 176), the purpose of which is to contain enough data bits to be shifted at the T1 clock rate, to allow simultaneously the monitoring of a subset of five bits separated from each other by 192 other bits, or a entire frame.

Thus, those registers contain a total of four frames of delayed data, from which four bits b21, b31, b41 and b51 belonging each to a different frame and having each the same position in their respective frames, can be selected and transmitted on wires (180, 182, 184, 186), to the 1st decoding means (128), to which the first cell of the registers (164, 168, 172, 176) of the first detecting means are connected.

As will be further explained, the bits b21, b31, b41 and b51 which are transmitted to the 1st decoding means (28) represent a potential valid subset which will, if detected to be really a valid subset by said 1st decoding means, start the synchronization verification algorithm. This algorithm will compare the next potential synchronization bit of the synchronization pattern, with the b11 bit, which is detected by the 2nd detection means (138). These comprise another shift register (160, 162) connected serially ahead of the first register (164) of the 1st detection means (122). These above mentioned registers (160, 164, 168, 172, 176) comprise five discrete technology eight bits shift registers, called hereafter SR1, SR2 SR3, SR4 and SR5, and four integrated technology shift registers (162, 166, 170, 174) which are each 185 bits long and are hereafter called FR1, FR2, FR3 and FR4.

Figure 7:
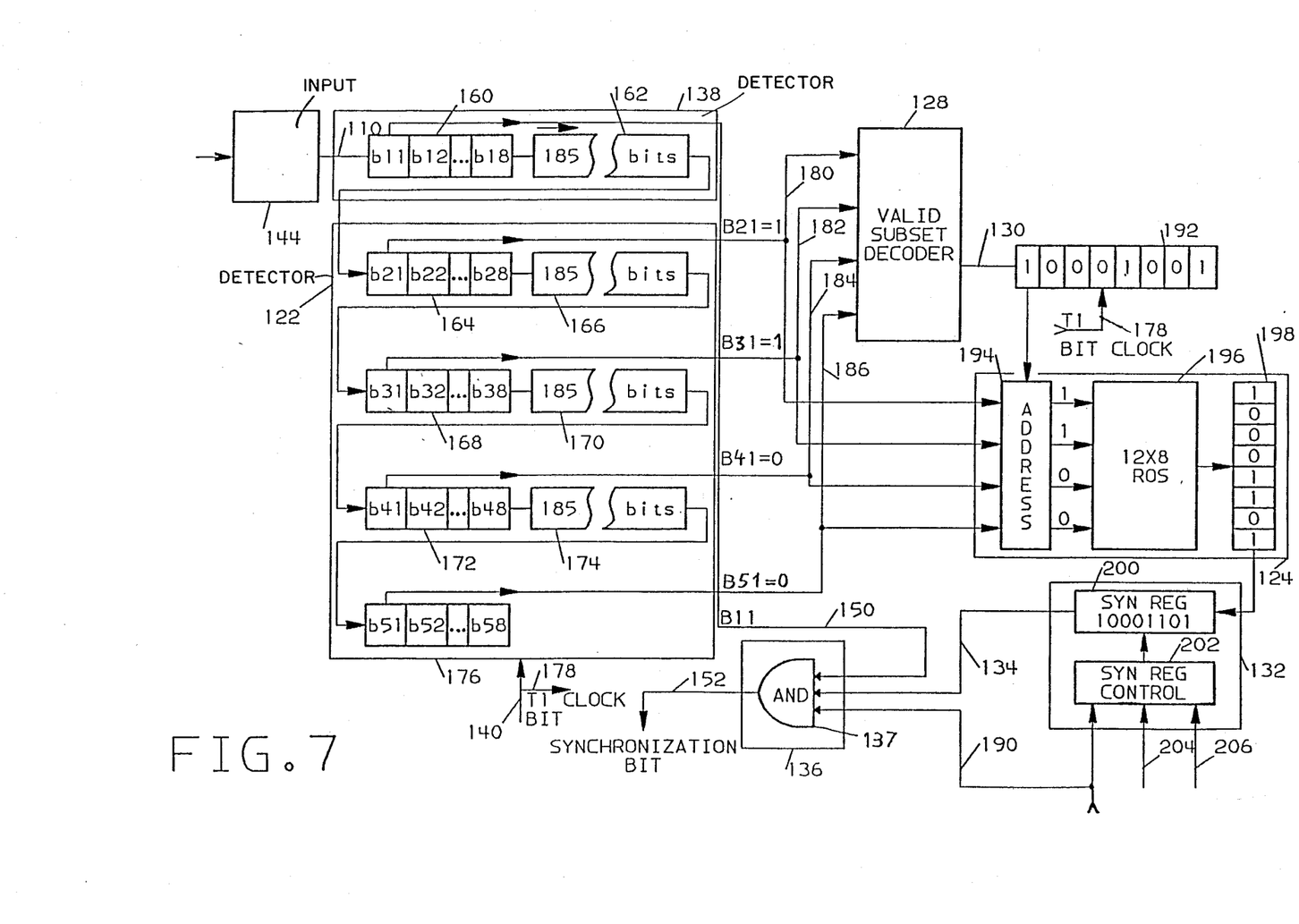
FIG. 7 is a more detailed logic diagram of a part of the general implementation shown in FIG. 2.
Figure 8:
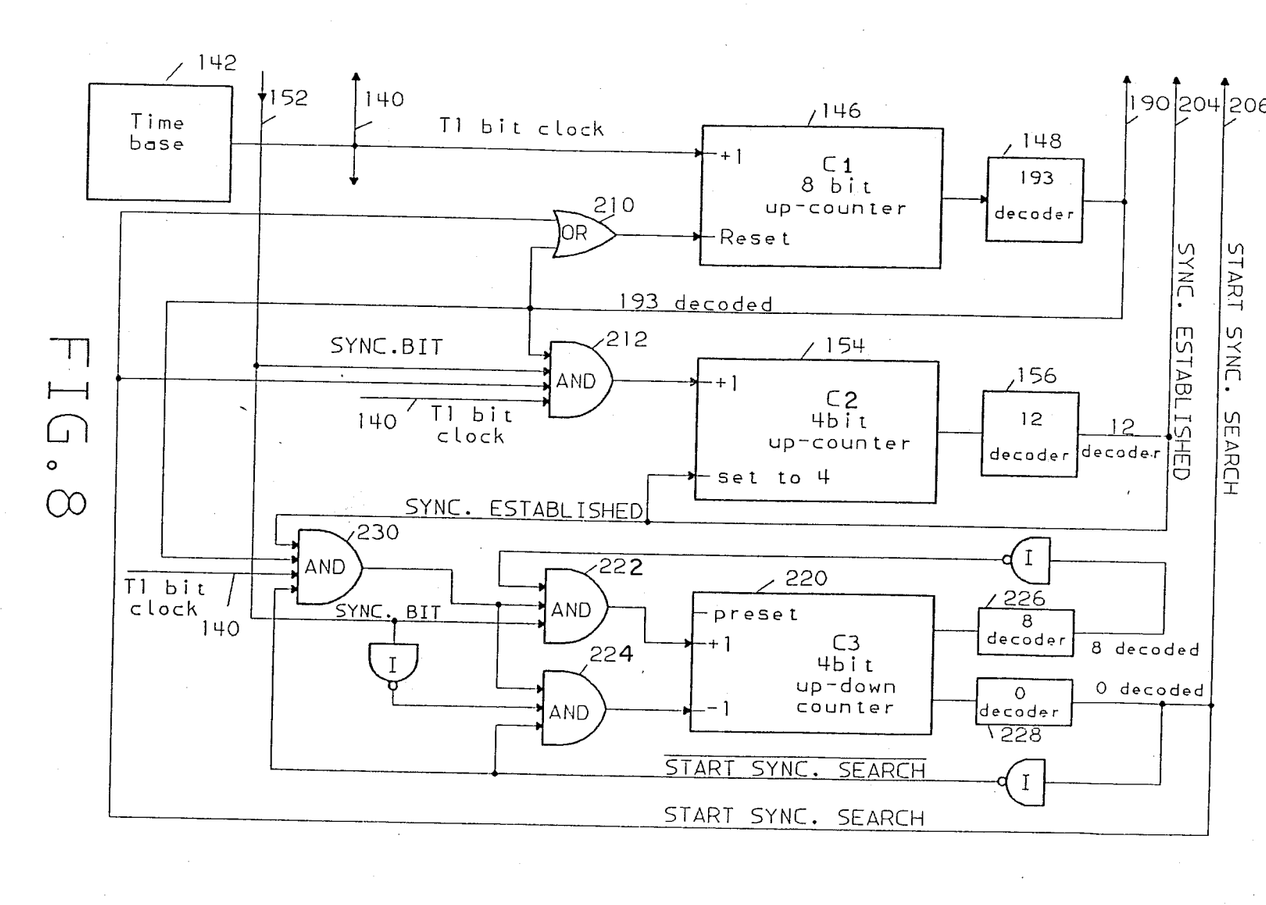
FIG. 8 is a more detailed logic diagram of another part of the implementation shown in FIG. 2.

As shown in FIG. 7, all the above mentioned registers are connected in a serial way, each long shift register FRi being connected between two eight bits shift registers SRj, SRj+1. The purpose of the long shift registers is to act as a delay line allowing, for each, to keep nearly one frame of received T1 data bits in storage. Besides, each of the eight bits shift registers has at least a first cell bk1 (where k is the number of the register: 1, 2, 3, 4 or 5) which is individually accessible, so that its content may be detected at T1 clock rate and transmitted to the 1st decoding means (128), where it is used as described farther.

According to the structure of the detecting means, the monitoring of the cells b21, b31, b41 and b5 will provide a subset of four bits which constitute a potential valid subset of the synchronization pattern 100011011100, while the b11 cell contains the next succeeding potential synchronization bit, which has to be compared with the corresponding predicted synchronization bit provided by the storage means (124). To perform the shifting of the data shift registers at T1 clock rate, each of the registers (160 ...176) receives the T1 clock pulse, provided on line 140 to its "shift command" entry. Besides, to permit the decoding of the successive potential valid subsets to detect a valid subset, the content of the cells b21, b31, b41 and b51 are transmitted in parallel form on wires (180, 182, 184, 186) to the 1st decoding means (128). Those means generate a "valid address" bit equal to 1 if the values contained in the cells b21, b31, b41, b51 constitute a valid subset of four consecutive bits of the synchronization pattern, that means one of the following subsets: 0001, 0010, 0011, 0100, 0110, 0111, 1000, 1001, 1011, 1100, 1101, 1110. In the contrary, it generates an "invalid address" bit equal to "0", if an invalid subset is decoded: 0000, 0101, 1010, 1111. Therefore, the 1st decoding means (128) are preferably a simple combinatorial logic only including a few AND and OR gates. Therefore, they are here simply represented as a block circuit. The said valid or invalid address bit is transmitted on wire (130), and the successive values of said bit are loaded into an eight bit valid address shift register (192), the shifting of said register being also made at the T1 clock rate.

The output of shift register (192) is fed to the address decoding circuit (194) of the storage means (196), for which it acts as a "read" command. The storage means (196) are preferably a Read Only Storage (ROS), which accepts 12 addresses and delivers for each address one byte (8 bits) output, equal to a subset of eight consecutive bits of the synchronization pattern of 12 bits.

When the valid address bit output by the valid address shift register (192) is equal to "1", the subset of four bits of the synchronization pattern addresses the corresponding byte in the ROS, that means the subset of eight remaining bits which complete the synchronization pattern. This byte is then parallel loaded into the output register (198) of the ROS and loaded into a synchronization pattern shift register (200) designated "SYN REG".

However, this loading is only made under control of the SYN REG Control Circuit (202). The latter includes simple combinatorial logic, and transmits a shift control command to the SYN REG (200) on receipt of a "new synchronization search" command, indicating that a new synchronization search is in progress. More accurately, the control circuit (202) transmits a shift command to the SYN REG (200) at the proper time, to prevent a new subset of eight bits to be loaded into said SYN REG, while a current synchronization search is still using the old subset. This shift command is active if either the SYN REG (200) receives an indication that a synchronization status has been reached ("sync. established"=1 on wire (204)), or a new synchronization search is on, if synchronization had been temporary lost ("sync. search on" signal=1 on wire (206)).

The generation of those last cited signals will be described farther. Besides, within a synchronization search process, the SYN REG (200) is shifted by one position to the left each time a "193 decoded" signal has been transmitted to the SYN REG Control Circuit (202). At a given moment, the first cell of the SYN REG, relatively to its serial output (134), contains the first predicted bit of the synchronization pattern which should immediately follow the four bits of the valid subset which has been decoded by the 1st decoding means (128). According to the synchronization method detection described, this predicted bit has to be compared to the last detected potential bit of the synchronization pattern, which is present in the cell b11 of the shift register (160).

Therefore, the content of said cell b11 is transmitted on wire (150) and ANDed in gate (136) acting as the above mentioned comparison means) with both the said first bit of the SYN REG (200) and the "193 decoded) signal which is previously generated, as will be explained farther.

Thus, the "193 decoded" signal indicates, when high, that the bit which is meanwhile transmitted by the SYN REG on wire (134) is to be considered as a synchronization bit, transmitted to the comparison means (136), which are very simply implemented by an AND gate (137). This gate receives besides the current b11 bit provided on wire (150), and a "193 decoded" signal transmitted on a wire (190). As a result, the output (154) of AND gate (137) delivers, when high, a synchronization bit which is the result of a match between the predicted synchronization bit available at the output of the SYN REG, and the detected potential synchronization bit b11. This synchronization bit generated at the output of AND gate (137) is transmitted on wire (152) to the counting means shown in FIG. 8, which will now be described.

This part of the description of the invention deals with the means permitting the build up and the maintenance of the synchronization status given by a "synchronization established" signal, as well as its monitoring, thus allowing a rapid synchronization recovery after a temporary loss.

In the best implementation of said means for monitoring the synchronization status, it should be even easier to recover synchronization ("synchronization established" status high) after a few temporary errors, than it is to get synchronized for the first time. Thus, an additional feature will be described, which allows that a single error or a missing synchronization bit does not lead to lost synchronization. Besides, it is assumed that the implementation is designed in a manner according to which errors due to false synchronization bits during a phase of synchronization recovery or acquisition, will result into an overall restart of the synchronization build-up. According to the above mentioned features, three counters and their corresponding control logic are needed, as shown in FIG. 8.

A first eight bit up-counter C1 (146) is used to delimit the successive frames of the received signal. Therefore, it is incremented by one at the T1 clock rate until its count reaches 193, which value is decoded in decoder (148) where a "193 decoded" signal is generated. The latter is ORed with a "start synchronization search" signal generated as described below, and the output of OR gate (210) is applied again to the C1 counter as a reset command.

The "193 decoded" signal is also transmitted on a wire (190) to the SYN REG control circuit (202), as described before (FIG. 7). A second counter C2 (154) is used. It is a four bit up-counter which does the counting of the frames which contain the valid synchronization bit, and each count of twelve is decoded by a simple decoder (156) which accordingly generates a "12 decoded" signal.

This signal is fed back to the C2 counter (154), which is accordingly set to four. Thus, when counter (154) counts the number of consecutive matches (a maximum of eight) between consecutive detected potential synchronization bits b11 and the corresponding bits of the synchronization pattern, a count of twelve may be reached, and will mean that synchronization status has been reached. Accordingly, the "synchronization established" signal on line (204) will be high.

If one potential synchronization bit b11 is false, it generates on line (152) a synchronization bit equal to zero, and accordingly, the "synchronization established" signal will remain low. It is to be noted that, because of AND gate (212), each incrementation of counter (154) can only be made on receipt of a T1 bit clock pulse, and of a "start synchronization search" signal, whose generation will be described below. A third counter (220) is used: the C3 counter, which is a four bit up-down counter. This counter provides an additional feature, in that it allows to the synchronization status to be saved, once established, even when a single error or a few errors occur during the synchronization pattern continuous detection. Therefore, an AND gate (230) generates a C3 counting pulse, provided that the synchronization status is established and that the synchronization search is not just beginning (FIG. 8). This C3 counting pulse is ANDed by AND gate (222) together with the synchronization bit available on wire (152), and if an eight count is not yet reached by C3 (8 decoder low), each synchronization bit equal to "1" causes an incrementation of C3 counter by one. Similarly, the inverted synchronization bit and the C3 counting pulse are applied to another AND gate (224).

If synchronization status is not yet lost because of successive errors in the synchronization pattern detection (0 decoder (228) low), each synchronization bit equal to "0" causes a decrementation of C3 counter by one. Therefore, at a given moment, the count of C3 counter is between "0" and "8", and the synchronization status is still said to be maintained. Nevertheless, if the count reaches "0" after several errors during the synchronization pattern detection, the synchronization status is said to be lost, and a "start synchronization search' signal is transmitted on wire (206) toward the SYN REG control (202), to get a new synchronization search process started.

It is to be noted that other implementations would have been possible for the synchronization detection method corresponding to the the described algorithm. Especially, different lengths and interconnections could have been chosen for the T1 data shift registers (160 to 170) while remaining in the scope of the present invention. However, the implementation as described herein has been shown through computer simulation to present the advantage of speed of synchronization recovery, even in the presence of transmission errors. Besides, it is to be noted that, since the data shift registers (160, 164, 168, 172, 176) contain eight bits each, they will contain one PCM word transmitted on the T1 channel), and those 8-bit words might accordingly advantageously be processed by an 8-bit microprocessor.

While I have illustrated and described the preferred embodiment of my invention, it is to be understood that it is capable of variation and modification and I therefore do not wish to be limited to the precise details set forth, but desire to avail myself of such changes and alterations as fall within the purview of the following claims.

I claim:

1. A method for detecting a predetermined pattern of n bits included within a serial bit stream transmitted from a transmission node to a reception node, said n bits being adjacent to or distributed over the bit stream according to a predetermined sequence, and representing a unique word chosen to contain m different valid subsets of n' successive bits, where each of such a subset is said to be valid provided it is determined in a unique manner by its position within the unique word and thus permits determination of n-n' remaining bits of said unique word, which follow the cited n' bits, said method comprising the steps of:

detecting subsets of n' bits of the serial bit stream;
   comparing each detecting subset of n' bits to all of the m valid subsets to identify the event of having detected a particular subset among the m valid subsets, and on said event;
   verifying if the entire unique word has been received, by determining among the received bits, each of potential bits of said unique word, and comparing consecutively each of those potential bits, to each of the (n-n') bits which follow the n' bits of the particular subset of the unique word which has already been detected;
   counting the number of successive matches that occur during the comparison step between each said potential bit of the unique word and the corresponding bit among the said (n-n') bits the unique word and when a predetermined number of matches is reached, deciding that the unique word has effectively been detected, and accordingly, raising an appropriate signal, which can in turn start an action or set an adequate status within a circuit.

2. A method according to claim 1, wherein the predetermined unique word is a synchronization pattern containing 12 bits regularly distributed over the serial bit stream of a TDM signal, said signal comprising frames of 193 bits containing each one bit of said synchronization pattern to be detected, the latter including m = 12 valid subsets of n'=4 bits, said method including:

detecting at said reception node, subsets of four bits of the serial bit stream, said four bits being spaced apart by 192 data bits;
   comparing each detected subset of four bits to all the 12 possible valid subsets of four consecutive bits of the synchronization pattern;
   identifying the event of having detected such a said valid subset of four bits, and upon said event,
   verifying if the whole synchronization pattern has been received, by determining among the received bits, each of the potential bits of said synchronization pattern, and comparing consecutively each of those potential bits, to each of the eight bits which follow the four bits of the particular subset of the synchronization pattern which has already been detected;
   initiating the counting of the number of consecutive matches between the couples of bits being compared, and incrementing said count by one at each new match;
   identifying the event of the said count reaching a predetermined number A, and upon said event, setting a synchronization status signal "synchronization established" high in order to declare the synchronization pattern detected;
   upon synchronization pattern detection, monitoring the synchronization status, and incrementing the said count by one at each new match or decrementing it at each new mismatch, and
   declaring the synchronization status to be lost if the said count should become equal to zero, and
   when the synchronization status is lost, resetting the whole synchronization pattern detection process.

3. An apparatus for detecting a predetermined pattern of n bits included within a serial bit stream transmitted from a transmission node to a reception node, said n bits being adjacent to or distributed over the bit stream according to a predetermined sequence, and representing a unique word chosen to contain m different valid subsets of n' successive bits, where each of such a subset is said to be valid provided it is determined in a unique manner by its position within the unique word and thus permits determination of n-n' remaining bits of said unique word, which follow the cited n' bits, said apparatus being located at a reception node where it receives, at a rate defined by a received clock signal, the serial bit stream comprising the data bits and the bits contained in the unique word, said apparatus comprising:
   first detection means for the detection of n' bits of the bit stream, said first detecting means being connected to first decoding means which generate a "VALID SUBSET" signal when the detected subset of n' bits is decoded as being a valid subset;

storage means containing m different subsets of (n-n') consecutive bits of the unique word, each of said subsets being equal to the unique word minus a said particular valid subset of n' bits, said storage means being addressed by the n' bits output by the first detecting means and delivering at their output the specific subset of (n-n') bits corresponding to the address applied to the entry of said storage means, upon receipt of said "VALID SUBSET" signal transmitted by said decoding means;

second detecting means for the detection, in the received serial bit stream, of the next potential bits of the unique word;

comparison means performng successively (n-n') comparison operations between, on the other hand, the said potential bits of the unique word which are being provided by said second detecting means, and on the other hand, the successive bits included in the specific subset of (n-n') bits provided by said storage means, said comparison means generating at an output, an "EQUALITY PULSE" equal to "one" each time a match occurs between two compared bits, and to "zero" each time a mismatch occurs;

first counting means connected to the output of the comparison means and performing the counting of said matches occurring during said (n-n') comparison operations;

second decoding means connected to said counting means and performing the decoding of a predetermined number reached by the first counting means, whereupon said second decoding means raise their output line in order to indicate that the unique word has been detected.

4. An apparatus according to claim 3, including an additional feature comprising, in case the bits of the unique word are regularly distributed within a framed serial bit stream of a TDM signal wherein two consecutive bits of the unique word are spaced by x data bits, an up-counter (C1) connected to an x-decoder generating an "x decoded" signal used to delimit the successive frames of the TDM signal;

an up-down counter (C3) incremented by one at each new match and decremented by one at each mismatch, said counter being connected to a zero-decoder providing a "new synchronization search on" signal.

5. An apparatus according to claim 3, wherein a first detection means for the detection of four bits of the serial bit stream spaced apart by 192 data bits include four eight-bit discrete technology shift registers alternatively connected in series with four 185-bit shift registers, a first cell b21, b31, b41, b51 being connected to the first decoding means.

6. An apparatus according to claim 3, wherein said second detection means include one discrete eight-bit shift register and one 185-bit shift register connected in series ahead of said first detection means.

7. An apparatus according to claim 3, wherein said first decoding means include combinatorial logic receiving the content of b21, b31, b41, b51 cells as parallel inputs, and delivering through an eight-bit valid address shift register, a read command transmitted to storage means when four bits applied as an address to said first decoding means correspond to a valid subset.

8. An apparatus according to claim 3, wherein said comparison means include an AND gate performing an AND function between the last detected potential bit (b11) of the synchronization pattern, the bit of said synchronization pattern which immediately follows the current valid subset, and a "193 decoded" signal provided by an up-counter (C1), said AND gate providing an "EQUALITY PULSE" to said first counting means.

9. An apparatus according to claim 8, wherein said first counting means include a four-bit up-counter (C2) performing the count of said "EQUALITY PULSE', said counter being connected to said second decoding means, which generate a "synchronization established" signal when a predetermined count is reached.

* * * * *